United States Patent [19]

Greenlee et al.

[11] Patent Number: 5,198,303

[45] Date of Patent: Mar. 30, 1993

[54] PAINTABLE HIGH SPECIFIC ADHESION POLYVINYL HALIDE COPOLYMER COMPOSITIONS

[75] Inventors: William S. Greenlee; Josef C. Vyvoda, both of Avon Lake; John L. Seiniger, Westlake, all of Ohio

[73] Assignee: The BFGoodrich Company, Brecksville, Ohio

[21] Appl. No.: 720,559

[22] Filed: Jun. 25, 1991

[51] Int. Cl.$^5$ .............................................. B32B 15/08
[52] U.S. Cl. .................................. 428/463; 428/520; 428/522; 428/537.1
[58] Field of Search ............. 428/463, 520, 522, 537.1

[56] References Cited

U.S. PATENT DOCUMENTS 3,888,942  6/1975  Pinten et al. ........................ 525/304
3,892,692  7/1975  Heiberger ............................ 524/143
4,752,639  6/1988  Haller et al. .......................... 525/66

Primary Examiner—Edith Buffalow
Attorney, Agent, or Firm—Miles B. Dearth

[57] ABSTRACT

Flexible or semi-rigid articles are formed from copolymers of vinyl halide monomers and an adhesion-promoting comonomer are directly painted. The invention also pertains to an article consistng of a metal, plasic or wood component placed in intimate contact with the melt-processed PVC copolymer composition, intimate contact occurring in the melt state, said copolymer comprising preferably 40–60 parts by weight of a vinyl halide monomer per 100 weight parts copolymer and a (meth)acrylate adhesion-promoting comonomer, said copolymer exhibiting high specific adhesion to polar metals and polar polymer substrates.

16 Claims, No Drawings

PAINTABLE HIGH SPECIFIC ADHESION POLYVINYL HALIDE COPOLYMER COMPOSITIONS

TECHNICAL FIELD

This invention relates to flexible or semi-rigid articles derived from polyvinyl halide copolymer compositions. The articles can be directly painted and the finished surfaces exhibit superior permanence of appearance and durability. The compositions are absent plasticizer and exhibit high specific adhesion to dissimilar polymeric materials such as polymer films, sheets and fibers.

BACKGROUND OF THE INVENTION

According to ASTM D883, rigid resinous compositions are defined as plastic materials which have a stiffness or apparent modulus of elasticity greater than 100,000 pounds per square inch at 23° C., when determined in accordance with The Method of Test for Stiffness and Flexure of Plastics (ASTM D747). In accordance with the same test, semi-rigid plastic materials are defined as having a modulus of elasticity greater than 10,000 pounds per square inch at 23° C. and flexible plastic materials are defined as having a modulus of elasticity less than 10,000 pounds per per square inch at 23° C.

Flexible or semi-rigid polyvinyl halide resin compositions are useful in a wide variety of applications due to the durability and resistance to solvents of the compositions. These applications include manufacture of articles derived from these compositions which are useful in the automotive, construction and appliance industries. Articles derived from rigid polyvinyl halide compositions are readily coated, printed on or painted and exhibit good adhesion of the coating and good permanence of appearance.

Conventional melt-processed flexible or semi-rigid polyvinyl halide resin compositions contain a plasticizer which is susceptible to migration. Internally plasticized PVC copolymer latexes are also well established. These aqueous dispersions are cast into films where the polymer coalesces from water to form a film during drying. Solution PVC and organosols of PVC are known, these are used in slush molding or spread coating. The PVC fuses on application of heat. Plastisols are known, and fusion takes place after casting, dipping or blow molding by subsequent heating. The present invention is directed not to these forms of PVC but to melt-processed PVC. That is, PVC compositions which are compounded in the melt state, and formed or applied to articles in the melt state by the use of melt processing techniques, further elaborated hereinbelow.

Various approaches to improve migration properties of flexible or semi rigid polyvinyl halide compounds are known. U.S. Pat. No. 3,892,692 to Heiberger discloses flexible vinyl chloride-ethylene copolymer compositions blended with a plasticizer and having a low permanent modulus index, thus, more expensive polymeric plasticizers are avoided. The vinyl chloride-ethylene copolymers are internally plasticized and lower amounts of inexpensive external plasticizer are required to obtain a flexible product. By the use of low cost plasticizers containg 20 to 42 major atoms, the resulting vinyl chloride-ethylene copolymer compositions exhibit a high degree of plasticizer permanence. The compositions of Heinerger being blends of plasticizer and (polyvinyl chloride-ethylene) with ethylene being, a non-polar comonomer, however, contain external plasticizer and were observed to exhibit migration although to a lesser extent.

PVC-acrylate copolymers are disclosed by Haller in U.S. Pat. No. 4,752,639 pertaining to grafted embodiments. In particular, Haller teaches flexible to soft shaped articles containing a vinyl chloride-acrylic acid ester graft copolymer containing 20 to 60% by weight of acrylic acid ester polymer and 40 to 80% by weight of vinyl chloride and 0 to 30% by weight of other ethylenically unsaturated comonomers copolymerizable with vinyl chloride grafted thereon. Compounds utilizing conventional additives are demonstrated. Haller teaches the graft copolymer of a preferred embodiment together with stabilizers conventionally used in PVC technology exhibits an ideal pattern of properties for many applications. Thus, the products are distinguished by good flexibility without plasticizer migration being able to occur; they possess excellent low temperature properties; are stable to aging and weathering and have good oil resistance; and the surfaces are smooth and homogeneous. Furthermore, the graft copolymer can without any problems be converted into shaped articles, especially sheet-like structures, which can readily be glued and printed, can be high frequency welded, are readily thermoformable and are distinguished by tensile strength, good tear strength, good elongation at break and good tear propagation resistance. Haller demonstrates blends of these graft copolymers and various other thermoplastic polymers such as VAE, PMMA, PV, polyether copolymers, PVDF and SMA among others.

The improvement of Heiberger is noteworthy within the scope of a free standing, unitary molded article such as a sheet, film, or mechanical part made from the copolymer. However, when a copolymer having migratable plasticizer is painted or the copolymer is incorporated on or about a dissimilar substrate, interfacial adhesion is critical. Permanence of adhesion is compromised by the migrating component. Such exemplary multicomponent articles are PVC and a substrate, such as vinyl coated metal, vinyl cladding on wood, and co-extrusion or co-injection molding with another plastic. Any migration over long periods will affect adhesion in addition to effects on paint compositions incorporated thereon.

The use of plasticized PVC compositions present limitations apart from adhesion parameters and plasticizer migration. Over the years PVC compounds have predominated in wire and cable insulation. These compounds contain typically polyvinyl chloride resin, plasticizer, filler typically clay), and heat stabilizer, with lubricants, pigments and other optional modifiers. Electrical grade polyvinyl chloride resin must have a high electrical resistivity, which can be expressed in terms of a high volume resistivity, in excess of $10^{11}$ ohm-cm and preferably in excess of $10^{12}$ ohm-cm, measured in water at 60° C. This property applies to all classes of wire.

Many commonly used stabilizers and plasticizers cannot be used in melt-processed electrical grade polyvinyl chloride resin compositions because they reduce the electrical resistance. For example, plasticizers such as tricresyl phosphate and dioctyl phthalate reduce volume resistivity in inverse proportion to the amount of such plasticizer present. A semirigid or flexible melt-processible PVC, absent plasticizer and exhibiting volume resistivity in excess of $10^{11}$ Ohm-cm, with improved permanent adhesion to metal conductors and having inherent non-migrating characteristics would thus be commercially attractive.

Plasticizers present problems in coating of plasticized melt-processed PVC with over-varnishes, lacquers or paint. Under normal use conditions this plasticizer can migrate out of the polyvinyl halide resin composition and attack the coating. If a paint composition not derived from plasticized PVC itself were applied to the composition, this plasticizer migration into the paint can attack the composition, and marring of the weakened coating as well as loss of its adhesion to the surface of the composition occurs. This is unacceptable for durable, appearance articles. Consequently, the use of flexible or semi-rigid melt-processed polyvinyl halide compositions for applications where the ability to be painted is desired are discouraged despite the benegits that the polyvinyl halide compositions would otherwise provide to the application.

In view of these disadvantages, it would be desirable to have melt-processible flexible or semi-rigid polyvinyl halide compounds absent external plasticizer which migrates or interferes with adhesion to dissimilar substrates or paint coatings, thereby providing compositions which permanently adhere to substrates, retaining high adhesive strength and on which the surface can be painted and will retain paint adhesion, strength and appearance of the paint over long periods of use. Flexible or semi-rigid melt-processed polyvinyl halide compositions exhibiting high specific adhesion to polar metal, polymeric or wood substrates would also be commercially desirable as clear or pigmented protective coatings, including extruded or molded claddings over these substrates.

SUMMARY OF THE INVENTION

In one aspect, this invention pertains to an article consisting of a metal, plastic or wood component placed in intimate contact with a melt-processed PVC copolymer composition, intimate contact ocurring in the melt state, said copolymer comprising preferably 40–60 parts by weight of a vinyl halide monomer per 100 weight parts copolymer and a (meth)acrylate adhesion-promoting comonomer, said copolymer exhibiting high specific adhesion to polar metals and polar polymer substrates. In another aspect, the invention is a copolymer of PVC melt processed to form a useful article in combination with a paint coating directly applied to the article of the PVC copolymer composition. The paint has high adhesion to the copolymer and exhibits permanence of appearance in combination therewith.

In a further aspect, the invention is a useful article comprising, in combination, the polar substrate, PVC copolymer and paint coated thereon which exhibits long term aging and integrity including resistance to marring, flaking, cracking and weathering resistance.

In yet another aspect, this invention is a process for providing an article derived from a melt-processed polyvinyl halide resin compound which is flexible or semirigid and optionally, directly applying a paint thereon while maintaining the integrity and adhesion of the paint composition over long periods of time. The process comprises melt-processing a copolymer of vinyl chloride and (meth)acrylate in the fused state by either calendering, extruding, molding, laminating or otherwise applying said copolymer in the melt state to a substrate to form a useful article. The process optionally further comprises applying a paint composition to at least one surface of the copolymer composition.

DETAILED DESCRIPTION OF THE INVENTION

The copolymers useful in this invention consist essentially of vinyl halide monomers and polar adhesion-promoting (meth)acrylate comonomers. More specifically, the vinyl halide monomers are selected from the group consisting of vinyl chloride, vinyl bromide, vinyl fluoride, vinylidene chloride and 1,2-dichloroethylene, and halogenated derivatives thereof and mixtures thereof. The most preferred vinyl halide monomer is vinyl chloride. The vinyl halide monomer provides the copolymer with toughness and resistance to moisture and chemicals. Hereinafter, the invention will be illustrated as the vinyl chloride embodiment.

The preferred copolymer is a melt processible polyvinyl chloride-acrylate copolymer comprising (a) a vinyl chloride monomer and (b) one or more acrylate or methacrylate ((meth)acrylate) comonomers. The amount of vinyl chloride monomer utilized to make the polyvinyl chloride copolymer is a sufficient amount so that the polyvinyl chloride copolymer has a flexural modulus less than 100,000 psi, is melt-processible and exhibits flexibility and adhesion improvements. Generally the copolymer contains from about 10 parts to about 90 parts by weight, desirably from about 25 parts to about 80 parts by weight and preferably from about 40 parts to about 60 parts by weight of vinyl chloride units therein for every 100 parts by weight of the copolymer. Thus, the amount of the (meth)acrylate units in the copolymer is generally from about 90 parts to about 10 parts by weight, desirably from about 75 to about 20 parts by weights, and preferably from about 60 to about 40 parts by weight. Additional optional vinyl comonomers can be incorporated in an amount of from about 0 to about 45 parts by weight with from about 0 to about 20 parts by weight being preferred. By the term "vinyl comonomer", it is meant a comonomer having an ethylenic group. Such comonomers are well known to the art and to the literature and are derived for example from vinyl esters wherein the ester portion contains from 1 to 18 carbon atoms such as vinyl acetate; styrene and styrene derivatives having a total of from 8 to 15 carbon atoms such as alpha-methylstyrene, vinyl toluene, chloromethyl styrene, chlorostyrene; vinyl naphthalene; vinylidene chloride; 1,2-dichloroethylene, di-olefins having a total of from 4 to 18, including halogenated diolefins; monoolefins having a total of from 2 to 18 carbon atoms and preferably 2 to 4 carbon atoms; and the like. Vinyl acetate is a preferred vinyl comonomer.

The one or more (meth)acrylate comonomers contained in the polyvinyl chloride(meth)acrylate copolymer has the formula, before polymerization,

$$H_2C=C(R^1)C(O)OR^2$$

wherein $R^1$ is an aromatic, an aliphatic such as an alkyl, or combinations thereof, having from 1 to 18 carbon atoms, or a halogen derivative thereof. $R^1$ desirably is methyl, and preferably is hydrogen. $R^2$ is an aliphatic group, especially an alkyl, an aromatic, an alkyl hydroxyl, or combinations thereof, having from 1 to 18 carbon atoms, desirably from 2 to 10 carbon atoms, and preferably from 2 to 8 carbon atoms, or a halogen derivative thereof; or $R^2$ is a hydrocarbyl ether such as alkoxyalkyl, a phenoxyaryl, or a phenoxyalkyl, or combinations thereof preferably having from 2 to 1,000 carbon atoms, desirably from 2 to 18 carbon atoms, and more preferably from 2 to 8 carbon atoms, or a substituted halogen, oxygen, nitrogen, or sulfur derivative thereof. Examples of specific acrylate monomers include ethyl acrylate, propyl acrylate, butyl acrylate, hexyl acrylate, octyl acrylate, 2-ethyl hexyl acrylate, nonyl acrylate, decyl acrylate, phenyl acrylate, nonylphenyl acrylate, ethyl methacrylate, butyl methacrylate, hexyl methacrylate, 2-ethyl hexyl methacrylate, alkoxyalkyl acrylates such as methoxymethyl acrylate, methoxyethyl acrylate, ethoxyethyl acrylate, butoxyethyl acrylate, ethoxypropyl acrylate, 2(2-ethoxyethoxy)ethyl acrylate, and carboxyalkyl acrylates such as 2-carboxyethylacrylate. Especially preferred acrylate monomers include butyl acrylate, 2-ethyl hexyl acrylate and ethyl acrylate.

As noted hereinabove, the $R^2$ group can be a hydrocarbyl ether group. That is, it can be an ether, a diether, or a multiple ether of an alkyl, an aryl, or combinations thereof, such as the aforementioned alkoxyalkyl acrylates, a phenoxyaryl, a phenoxyalkyl, and the like, generally having from 2 to 1,000 carbon atoms, desirably from 2 to 18 carbon atoms, and preferably from 2 to 8 carbon atoms, or combinations thereof. Examples of specific phenoxyalkyl acrylate include 2-phenoxyethyl acrylate, and 2-phenoxyethyl methacrylate.

Advantageously, the preferred comonomers impart flexibility to the copolymers. The specific comonomer employed will vary according to the flexibility desired and alternatively in consideration of the type of paint composition to be used. For example, when using a low polarity paint such as one based in part on polyolefins, a less polar comonomer combination such as a mixture of olefin and acrylate or vinyl ester is used. One such copolymer of vinyl chloride-ethylene is disclosed in U.S. Pat. No. 3,892,692 and is not suitable, absent a polar comonomer in combination. Whereas, when using a relatively higher polarity paint such as one based on polyesters, a comonomer having relatively higher polarity or a mixture is suggested such as hydroxyethyl acrylate, 2-carboxyethyl acrylate or combinations of one of these and an ethylenic unsaturated carboxylic acid.

In another embodiment of the vinyl halide copolymer, termed a graft copolymer, the copolymer is derived from a vinyl halide polymerized in the presence of a flexible polymer composition comprising a substantial amount of the preferred comonomer. The amount of the flexible composition in the final polymerizate with vinyl halide is an amount sufficient to render the final composition flexible or semi-rigid. Examples of graft copolymers within the meaning of this invention are disclosed in U.S. Pat. Nos. 3,853,970, and 3,888,948 incorporated herein by reference.

Various conventional additives in conventional amounts can be utilized in the blends of the present invention. Thus, various heat stabilizers such as barium/cadmium compounds, lead compounds, and organotin compounds, various conventional lubricants generally utilized with polyvinyl chloride polymers such as paraffin, polyethylene, stearic acid, various processing aids such as polyacrylates, various antioxidants such as BHT, that is butylated hydroxy toluene, BHA, that is butylated hydroxy anisole, and various hindered phenols, various UV inhibitors such as substituted benzophenones, and the like, can be utilized.

Various fillers and pigments can also be utilized in conventional amounts by weight for every 100 parts by weight of the polyvinyl chloride copolymer. Examples of fillers include calcium carbonate, clay, silica, the various silicates, talc, carbon black, and the like. Such fillers are generally added in high amounts as from about 10 to about 300 parts by weight for every 100 parts by weight of the polyvinyl chloride-acrylate copolymer. Examples of various pigments include titanium dioxide, carbon black, and the like. Generally, the amount of such pigments is not as large as the amounts of the fillers.

The mass, suspension, dispersion, emulsion and micro suspension polymerization processes are pertinent to the preparation of said copolymers of vinyl chloride. Preferably, the process is generally carried out in an aqueous medium. A mass process is described in U.S. Pat. No. 3,522,227, incorporated herein by reference. A phase inversion process may also be used in incorporating the dispersant system of the present invention. Such a phase inversion process is disclosed in U.S. Pat. No. 3,706,722, incorporated herein by reference. In the phase inversion process, the monomer is the continuous phase during the early part of the polymerization and after about 10% conversion additional water is added such as to make the water the continuous phase and the monomer the discontinuous phase.

The particles of suspension or mass polymerized PVC have an average particle size ranging generally from 50 to 500 microns, preferably 50 to 250 microns. With the most preferred average particle size from 100 to 200 microns. The PVC particles made by suspension and mass processes are actually agglomerated primary particles, these agglomerates may have generally an irregular shape. The can be made alternatively or are nearly spherical. Excessive agglomeration of particles or generation of fine particles less than about 20 microns are not desirable forms for the melt-processed copolymers employed here. Therefore, the bulk density of the copolymer resins will range from about 0.3 gms/cc to about 0.65 gms/cc and preferably higher than about 0.4 gms./cc. The particles are preferably friable, that is, on application of shear and heat input, the agglomerates are readily reduced to primary particles as the compositions undergo the transition from the particulate state to the fused state after reaching melt mixing.

The most preferred copolymer is a suspension polymerized particulate resin having an average particle size of from between 50 to 250 microns, comprising from 40 to 60 weight parts vinyl chloride and from 60 to 40 parts of an acrylate monomer selected from the group consisting of ethyl acrylate, butyl acrylate, ethylhexyl acrylate and mixtures of these.

The process of this invention to form useful articles includes a variety of melt-processing techniques such as calendering, molding, extrusion, lamination extrusion blow molding, blown film methods, injection blow molding, injection molding co-extrusion, co-injection molding and compression molding. Preparation of the copolymer compound is carried out by blending selected compounding ingredients. Optionally the blend termed a dry blend is fluxed in the melt state to a uniform consistency and processed into chips, cubes or pellets. The aforementioned article forming melt-processing techniques are used to convert the compound into useful articles. For flexible and semi-rigid articles, injection molding and extrusion are preferred processes. Typically, flexible articles exhibit a tensile strength of less than about 3000 psi, while a semi-rigid article will exhibit a tensile strength of from about 3000 to about 6000 psi. An article is typically considered rigid if the tensile strength is greater than 6000.

In one embodiment at least one of the surfaces of the article formed from the copolymer is coated with a paint composition. Typical paint compositions include acrylic enamel compositions comprising an alkyl acrylate polymer and a pigment and polyester based paint compositions containing a pigment.

The painted copolymer articles of this invention are flexible or semi-rigid and exhibit good adhesion and permanence of adhesion between the paint composition and the surface of the article. Over extended periods of time of normal use, the painted surface retains it's initial durability and is not degraded by the polyvinyl halide copolymer compound. After storage for a few years at about 25° C., flexible articles formed from a copolymer of 53% vinyl chloride and 47% 2-ethylhexyl acrylate maintained adhesion to paint compositions known as Industrial Refinishing Spray Paint Acrylic Enamel "Sprayon," 01510 OSHA Blue, 01800 OSHA White and 01770 OSHA Gloss Black, all available from Sprayon Products Industrial Supply Division of Sherwin-Williams Company.

The following example of the invention will illustrate a reduction to practice and is not a limitation of its scope.

EXAMPLE

A copolymer of vinyl chloride and 2-ethylhexyl acrylate is prepared by charging the following the ingredients to a polymerization vessel:

| Water | 2223 kg. |
| --- | --- |
| Vinyl chloride monomer | 889 kg. |
| 2-ethylhexyl acrylate | 593 kg. |
| Polyvinyl alcohol dispersant solution | 28.2 kg. |
| Substituted cellulose dispersant solution | 22.7 kg. |
| Initiator solution (75%) | 0.445 kg. |

The vessel is charged with the water and the dispersants, and after evacuation, the mixture of monomers is added. The contents are mixed and the temperature is adjusted to 55° C. The initiator is added and the reaction is started. The polymerization is conducted under agitation for 420 minutes, and then the reactor is cooled to room temperature. The reaction product is transferred to a stripping vessel to remove unreacted monomers. After stripping, the reaction product is recovered by filtration and dried.

The reaction product is then made into a compound and injection molded by heating to a temperature sufficient to melt the product, then injecting the product into a molding cavity containing a metal article such as a metal strip to be attached to a body panel of an automobile and cooling to yield the multi-component article.

A surface of the article is coated with a paint composition known as 01510 OSHA Blue. The paint adheres very well to the surface of the article based on assessing the adhesion using a cross-batch type test with adhesive tape #810 Scotch ™ type produced by 3M Corporation. Thus, a useful article such as an appliance part, a bumper strip or a "rubber" coated steel panel, the paint providing a wear coat which does not easily mar after long service. The paint provides a decorative lustre to the article and the color can be identically matched to other componentry.

In another embodiment, the copolymer is compounded with processing aid, lubricant and filler in the melt state. The compound is extruded directly onto a metal substrate, the combination of the metal occurs with the compound while in the heated melt state. The combined article is cooled and will exhibit permanence of adhesion, will not blister or delaminate under normal intended use.

In another embodiment the copolymer is compounded with tin stabilizer processing aid, lubricant and filler in the powdered state. The compound is mixed to a uniform consistency on a Banbury and 2-roll mill. The melt mixture is extruded and chopped into pellets and cooled. The pellets are fed in to an extruder and extruded over a wood profile. Subsequently, the copolymer wood part in combination is painted. The painted part exhibits long term durability, resists marring and maintains substantially it's initial painted appearance. Such an article is useful as a soft "rubberized" surface having excellent permanent adhesion to both the paint and the wood substrate.

The invention described herein above is not limited to the examples disclosed but by the appended claims.

What is claimed is:

1. A flexible or semi-rigid article comprising a substrate of metal, plastic or wood contacted with a melt-processed compound devoid of plasticizers, comprising a: copolymer of vinyl halide monomer and at least one adhesion-promoting comonomer having the formula:

wherein $R^1$ is selected from the group consisting of hydrogen, an aromatic group having from 6 to 18 carbon atoms, and an aliphatic group having from 1 to 18 carbon atoms; $R^2$ is selected from the group consisting of an alkyl, an aromatic, an alkyl hydroxyl and a hydrocarbyl ether group.

2. The article of claim 1 wherein the copolymer further comprises a comonomer selected from the group consisting of maleates, fumarates, acrylic acid, methacrylic acid, maleic acid, fumaric acid, maleic anhydride, vinyl acetate, vinyl stearate, vinyl butyrate.

3. The article of claim 1 wherein the vinyl halide monomer is selected from the group consisting of vinyl chloride, vinyl bromide and vinyl fluoride.

4. The article of claim 1 wherein at least one adhesion-promoting comonomer is selected from the group consisting of alkyl acrylates having from 2 to 8 carbons in the alkyl group, alkyl methacrylates containing 2 to 8 carbon atoms in the alkyl group, alkoxyalkyl acrylates having 2 to 8 carbons in the hydrocarbyl ether group, phenoxyalkyl acrylates having 2 to 8 carbons in the hydrocarbyl ether group, and phenoxyaryl acrylates having 6 to 18 carbons in the hydrocarbyl ether group.

5. The article of claim 1 wherein said adhesion-promoting comonomer is selected from the group consisting of ethyl acrylate, butyl acrylate, and ethylhexyl acrylates and mixtures.

6. The article of claim 3 wherein the adhesion-promoting comonomer is 2-ethylhexyl acrylate.

7. The article of claim 1 wherein the vinyl halide monomer is vinyl chloride.

8. The article of claim 1 wherein the adhesion-promoting comonomer is employed in an amount of from about 5 to about 90 parts per 100 weight parts of the copolymer product.

9. The article of claim 1 wherein the adhesion-promoting comonomer is employed in an amount of from about 20 to about 80 parts per 100 weight parts of vinyl halide monomer.

10. The article of claim 9 wherein the adhesion-promoting comonomer is employed in an amount of from about 40 to about 60 parts per 100 weight parts of vinyl halide monomer.

11. An article of claim 1 further comprising a paint.

12. An article of claim 11 wherein the paint is an acrylic enamel.

13. An article of claim 9 wherein prior to painting, said article is melt formed by the process selected from the group consisting of calendering, molding, extrusion, extrusion blow molding, blown film methods, injection blow molding, injection molding and compression molding.

14. A painted article derived from a vinyl halide graft copolymer compound which is devoid of plasticizer and comprising vinyl halide polymerized in the presence of a flexible polymer composition comprising a substantial amount of at least one adhesion-promoting comonomer selected from the group consisting of acrylate esters, methacylates esters, maleates, fumarates, acrylic acid, methacrylic acid, maleic acid, fumeric acid, maleic anhydride, vinyl acetate, vinyl stearate, vinyl butyrate.

15. A process for making a flexible or semi-rigid polyvinyl halide article, comprising:

melt-processing a compound devoid of plasticizer and comprising a copolymer of vinyl chloride and (meth)acrylate in the fused state by the method selected from the group consisting of calendering, extruding, molding, laminating and applying said copolymer in the melt state to a substrate selected form the group consisting of a metal article, a wood article, and a polymeric article.

16. The process of claim 15 further comprising the step of:

applying a paint composition to at least one surface of the article.

* * * * *